United States Patent [19]

Yamaya et al.

[11] Patent Number: 4,968,762
[45] Date of Patent: Nov. 6, 1990

[54] THERMOSETTING-RESIN-FORMING COMPOSITION FROM BIS-MALEIMIDE AND DIALLYL BIS PHENOL

[75] Inventors: Norimasa Yamaya; Masahiro Ohta, both of Yokohama; Akihiro Yamaguchi, Kamakura, all of Japan

[73] Assignee: Mitsui Toatsu Chemicals, Inc., Tokyo, Japan

[21] Appl. No.: 440,102

[22] Filed: Nov. 22, 1989

[30] Foreign Application Priority Data

Nov. 28, 1988 [JP] Japan .................. 63-298391

[51] Int. Cl.$^5$ .................................. C08F 22/40
[52] U.S. Cl. .................. 526/262; 524/548; 528/170; 528/321; 528/322
[58] Field of Search ............. 526/262; 528/170, 321, 528/322

[56] References Cited

U.S. PATENT DOCUMENTS 4,288,583  9/1981  Zahir et al. .................. 526/262
4,689,378  8/1987  Chaudhari et al. .................. 526/262

Primary Examiner—Harold D. Anderson
Attorney, Agent, or Firm—Burns, Doane, Swecker & Mathis

[57] ABSTRACT

This invention provides thermosetting-resin-forming compositions which are formed of (a) a bismaleimide compound represented by the following formula:

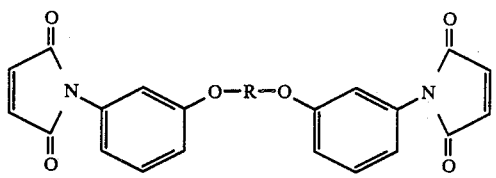

wherein R represents a divalent group of

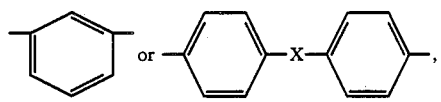

X being a direct bond or a group selected from the group consisting of divalent hydrocarbon groups having 1–10 carbon atoms, hexa-fluorinated isopropylidene, carbonyl, thio, sulfinyl, sulfonyl and oxo, and (b) a specific diallylbisphenol compound. These compositions can provide thermosetting resins having high cracking resistance due to improved impact resistance and toughness and low water absorption.

8 Claims, No Drawings

THERMOSETTING-RESIN-FORMING COMPOSITION FROM BIS-MALEIMIDE AND DIALLYL BIS PHENOL

BACKGROUND OF THE INVENTION (a) Field of the Invention: capable of forming thermosetting resins having excellent impact resistance and flexibility and low water absorption.

(b) Description of the Related Art:

Thermosetting resins having an imide structure have been used widely in the industry for many years because they have excellent electrical insulating properties and heat resistance and can provide molded or otherwise formed products having superb dimensional stability.

Thermosetting resins obtained from aromatic bismaleimides are however accompanied by the drawbacks of poor impact resistance and toughness, although they are insoluble and infusible and have excellent heat resistance.

As a method for improving the impact resistance and toughness of thermosetting resins obtained from aromatic bismaleimides, it was attempted to use an aromatic diamine along with an aromatic bismaleimide (see U.S. Pat. No. 4,831,102). For example, there was provided a polyaminobismaleimide resin formed from N,N'-(4,4'-methylenediphenylene)bismaleimide and 4,4'-diaminodiphenylmethane. It was however still unsatisfactory in impact resistance and toughness. Further, due to the use of the amine component, there were additional problems such as coloration by the remaining amino groups upon molding or formation and high water absorption of molded or otherwise formed products. In particular, the high water absorption caused internal cracks in molded or otherwise formed products in high-temperature environments. There has hence been a strong demand for the provision of a composition which can achieve a thermosetting resin having low water absorption.

There have also been known a process for producing a crosslinked imido-containing polymer by reacting an aromatic bismaleimide compound, which is different from those useful in the practice of the present invention, with an alkenyl phenol or an alkenyl phenol ether (U.S. Pat. No. 4,100,140) and a thermosetting resin composition obtained by the reaction of 4,4'-bismaleimidediphenylmethane and diallylbisphenol A [see "The 29th National SAMPE Symposium", 392 (1984)]. However, the former was inferior in flexural strength while improvements in strength and toughness characteristics were desired for the latter.

SUMMARY OF THE INVENTION

An object of this invention is to provide a composition which can provide a thermosetting resin having excellent impact strength and flexibility and low water absorption while retaining inherent excellent heat resistance.

In one aspect of this invention, there is thus provided a thermosetting-resin-forming composition comprising:

(a) a bismaleimide compound represented by the following formula (I):

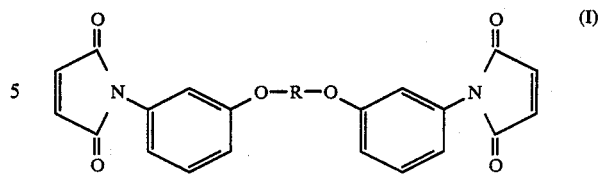

wherein R represents a divalent group of

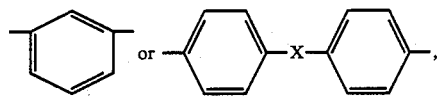

and X represents a direct bond or a group selected from the group consisting of divalent hydrocarbon groups having 1-10 carbon atoms, hexa-fluorinated isopropylidene, carbonyl, thio, sulfinyl, sulfonyl and oxo, and (b) a diallylbisphenol compound represented by the following formula (II):

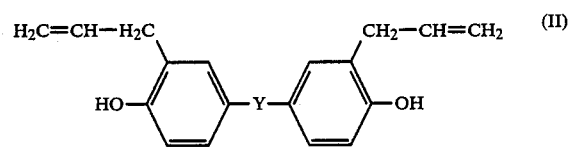

wherein Y represents a direct bond or a group selected from the group consisting of methylene, isopropylidene, hexa-fluorinated isopropylidene, thio and oxo;

the molar ratio of said bismaleimide compound (I) to said diallylbisphenol compound (II) being in a range of from about 10:1 to about 10:12.

DETAILED DESCRIPTION OF THE INVENTION

The bismaleimide compound represented by the formula (I) can be easily prepared by subjecting its corresponding diamine compound with maleic anhydride to a condensation/dehydration reaction in a manner known per se in the art. Specific examples of the bismaleimide compound include 1,3-bis(3-maleimidephenoxy)benzene, bis[4-(3-maleimidephenoxy)phenyl]methane, 1,1-bis[4-(3-maleimidephenoxy)phenyl]ethane, 1,2-bis[4-(3-maleimidephenoxy)phenyl]ethane, 2,2-bis[4-(3-maleimidephenoxy)phenyl]propane, 2,2-bis[4-(3-maleimidephenoxy)phenyl]butane, 2,2-bis[4-(3-maleimidephenoxy)phenyl]-1,1,1,3,3,3-hexafluoropropane, 4,4'-bis(3-maleimidephenoxy)biphenyl, bis[4-(3-maleimidephenoxy)phenyl]ketone, bis[4-(3-maleimidephenoxy)phenyl]sulfide, bis[4-(3-maleimidephenoxy)phenyl]sulfoxide, bis[4-(3-maleimidephenoxy)phenyl]sulfone, bis[4-(3-maleimidephenoxy)phenyl]ether, etc. They may be used either singly or in combination.

The diallylbisphenol compound represented by the formula (II) can be easily prepared by reacting its corresponding bisphenol compound and allyl chloride in a manner known per se in the art. Specific examples of the diallylbisphenol compound include 4,4'-dihydroxy-3,3'-diallylbiphenyl, bis(4 hydroxy-3-allylphenyl)methane, 2,2-bis(4-hydroxy-3-allylphenyl)propane, 2,2-bis(4- hydroxy-3-allylphenyl)-1,1,1,3,3,3-hexafluoropropane, bis(4 hydroxy-3 allylphenyl) sulfide and bis(4-hydroxy-3-allylphenyl) ether. They may be employed either singly or in combination.

Illustrative of the composition which comprises the bismaleimide compound and the diallylbisphenol compound and can provide a thermosetting resin include the following compositions:

(1) A composition obtained by simply mixing the bismaleimide compound and the diallylbisphenol compound.

(2) A composition obtained by mixing the bismaleimide compound and the diallylbisphenol compound, subjecting the resultant mixture to heat treatment and then grinding the mixture thus heat-treated into pellets or powder. As conditions for the heat treatment, it is preferable to choose conditions sufficient to allow the bismaleimide compound and the diallylbisphenol compound to partially cure to the stage of a prepolymer. It is generally suitable to heat the mixture of the bismaleimide compound and diallylbisphenol at about 70°-220° C. for about 5-240 minutes, desirably at about 80°-220° C. for about 10-180 minutes.

(3) A composition obtained by dissolving the bismaleimide compound and the diallylbisphenol compound in an organic solvent, subjecting the resultant solution to heat treatment to partially cure the bismaleimide compound and th diallylbisphenol compound to the stage of a prepolymer, pouring the heat-treated solution into a poor solvent to have the prepolymer precipitated as crystals, collecting the crystals by filtration, drying them, and then forming them into pellets or powder. Exemplary organic solvents which may be used include halogenated hydrocarbons such as methylene chloride, dichloroethane and trichloroethylene, ketones such as acetone, methyl ethyl ketone, cyclohexanone and diisopropyl ketone, ethers such as tetrahydrofuran, dioxane and methylcellosolve, aromatic compounds such as benzene, toluene and chlorobenzene, and aprotic polar solvents such as acetonitrile, N,N-dimethylformamide, N,N dimethylacetamide, dimethylsulfoxide, N-methyl-2-pyrrolidone and 1,3-dimethyl-2-imidazolidinone.

It is preferred to use the bismaleimide compound represented by the formula (I) and the diallylbisphenol compound represented by the formula (II) at a molar ratio in a range of from about 10:1 to about 10:12, preferably from about 10:2 to about 10:10. If the diallylbisphenol compound is used in an unduly small proportion, it is impossible to obtain a composition which can exhibit good impact resistance and flexibility when formed into cured products. In contrast, unduly large proportions of the diallylbisphenol compound result in a slow curing rate so that a long time is required upon curing. Further, such unduly large proportions adversely affect the heat resistance of products to be molded or otherwise formed.

The thermosetting-resin-forming composition according to the present invention may be added with the following components as needed to an extent not impairing the objects of the present invention.

(a) Curing accelerators, for example, radical polymerization initiators such as azo compounds and organic peroxides; and ionic catalysts such as tertiary amines, quaternary ammonium salts, imidazoles and trifluoroboron amine salts.

(b) Powdery reinforcing materials and fillers, for example, metal oxides such as aluminum oxide and magnesium oxide, metal hydroxides such as aluminum hydroxide, metal carbonates such as calcium carbonate and magnesium carbonate, diatomaceous earth powder, basic magnesium silicate, calcined clay, fine silica powder, fused silica, crystalline silica, carbon black, kaolin, fine mica powder, quartz powder, graphite, asbestos, molybdenum disulfide, and antimony trioxides; and fibrous reinforcing materials and fillers, for example, inorganic fibers such as glass fibers, rock wool, ceramic fibers, alumina fibers and potassium titanate fibers, and organic fibers such as carbon fibers and aromatic polyamide fibers.

(c) Various synthetic resins can also be added to improve the properties of the resulting resins in the final coating films, adhesive layers, molded or otherwise formed resin products, etc. Illustrative of these synthetic resins include thermosetting resins such as phenyl resins, epoxy resins, melamine resins and silicone resins, polyamides, polycarbonates, polysulfones, polyethersulfones, polyetheretherketones, modified polyphenylene oxides, polyphenylene sulfides, polyether imides, fluorinated resins, etc.

The components (a), (b) and (c) may each be added preferably in amounts of about 0.01-1 part, 5-400 parts and 5-100 parts by weight per 100 parts by weight of the thermosetting-resin-forming composition, respectively.

The thermosetting-resin-forming compositions according to this invention are molded or otherwise formed by a conventional molding or forming process such as compressing molding, transfer molding, extrusion or injection molding, whereby molded or otherwise formed products are provided for actual use.

The compositions of the present invention can provide thermosetting resins, which have excellent heat resistance and flexibility and low water absorption. For these properties, they are expected to find utility in a wide variety of products such as electric and electronic parts susceptible to deterioration under the adverse influences of adsorbed moisture, to say nothing of various structural members and selflubricating members. The compositions of the present invention can bring about substantial advantages when employed in the industry.

Examples 1-4:

A stainless steel reactor fitted with a stirrer, a reflux condenser and a nitrogen gas purge inlet was charged with 4,4'-bis(3-maleimidephenoxy)biphenyl and 2,2-bis(4-hydroxy-3-allylphenyl)propane at each molar ratio shown in Table 1. They were heated and melted at 180° C. for 30 minutes and then subjected to defoaming at 150° C. for 60 minutes under a reduced pressure of 10-15 mm Hg, followed by cooling to room temperature to obtain a resin composition solidified in the form of transparent brown glass.

The composition was charged into a mold at 180° C. while heating and melting the same. The composition was maintained at 200° C. for 30 minutes under 50 kg/cm$^2$, whereby it was compression molded. The resultant molding was taken out of the mold and then subjected to post curing for 4 hours in an oven at 250°

C. In this manner, cured products 127 mm long, 12.7 mm wide and 6.4 mm thick were obtained as test pieces.

Using some of these test pieces, the heat distortion temperature was measured in accordance with ASTM D-648 and a flexural test was conducted following the procedure of ASTM D-790. Additionally, further test pieces 63.5 mm long, 12.7 mm wide and 6.4 mm thick were formed by cutting some of the above-obtained test pieces. The Izod impact strength (unnotched) of one of the thus-cut test piece was measured in accordance with ASTM D-256. Using another test piece 63.5 mm long, 12.7 mm wide and 6.4 mm thick, the water absorption percentage was measured in accordance with ASTM D-570. The results are summarized in Table 1.

Examples 5–7 and Comparative Examples 1–3:

Using the bismaleimide compounds and diallylbisphenol compounds given in Table 1 at each molar ratio also shown in Table 1, experiments similar to Examples 1–4 were conducted to obtain the results shown in Table 1.

Comparative Example 4:

Using 1 mole of 4,4'-diaminodiphenylmethane as a diamine compound per 2 moles of N,N'-4,4'-diphenylmethanebismaleimide, experiments similar to Examples 1–4 were conducted to obtain the results given in Table 1.

wherein R represents a divalent group of

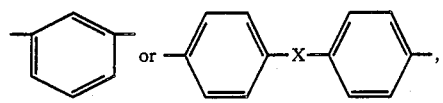

and X represents a direct bond or X is a group selected from the group consisting of divalent hydrocarbon groups having 1–10 carbon atoms, hexafluorinated isopropylidene, carbonyl thio, sulfinyl, sulfonyl and oxo, and (b) a diallylbisphenol compound represented by the following formula (II):

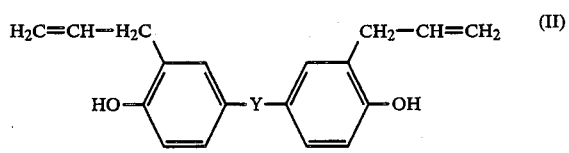

wherein Y represents a direct bond or Y is a group selected from the group consisting of methylene, isoropylidene, hexa-fluorinated isopropylidene, thio and oxo;

the molar ratio of said bismaleimide compound (I) to said diallylbisphenol compound (II) being in a range of from about 10:1 to about 10:12.

2. The composition of claim 1, wherein the bismaleimide compound is selected from the group consisting of 1,3-bis(3-maleimidephenoxy)benzene, bis[4-(3-maleimidephenoxy)phenyl]methane, 1,1-bis[4-(3-maleimidephenoxy)phenyl]ethane, 1,2-bis[4-(3-maleimidephenoxy)-phenyl]ethane, 2,2-bis[4(3-maleimidephenoxy)phenyl]-propane, 2,2-bis[4-(3-maleimidephenoxy)phenyl]butane, 2,2-bis[4-(3-maleimidephenoxy)phenyl]-1,1,1,3,3,3-hexafluoropropane, 4,4'-bis(3-maleimidephenoxy)biphenyl, bis[4-(3-maleimidephenoxy)phenyl]ketone, bis[4-(3-maleimidephenoxy)phenyl]sulfide, bis[4-(3-maleimidephenoxy)-

TABLE 1

| | Bismaleimide compound (molar ratio) | Diallylbisphenol compound (molar ratio) | Izod impact strength (unnotched) (kg·cm/cm) | Flexural strength (kg/mm²) | Flexural modulus (kg/mm²) | Heat Distortion Temp. (°C.) | Water absorption (%) |
|---|---|---|---|---|---|---|---|
| Ex. 1 | 4,4'-bis(3-maleimidephenoxy)-biphenyl (10.0) | 2,2-bis(4-hydroxy-3-allyl-phenyl)propane (1.25) | 20 | 18.9 | 390 | 295 | 0.28 |
| Ex. 2 | 4,4'-bis(3-maleimidephenoxy)-biphenyl (10.0) | 2,2-bis(4-hydroxy-3-allyl-phenyl)propane (2.0) | 24 | 18.7 | 385 | 290 | 0.27 |
| Ex. 3 | 4,4'-bis(3-maleimidephenoxy)-biphenyl (10.0) | 2,2-bis(4-hydroxy-3-allyl-phenyl)propane (5.0) | 29 | 18.3 | 377 | 286 | 0.27 |
| Ex. 4 | 4,4'-bis(3-maleimidephenoxy)-biphenyl (10.0) | 2,2-bis(4-hydroxy-3-allyl-phenyl)propane (10.0) | 31 | 14.4 | 371 | 272 | 0.26 |
| Ex. 5 | 1,3-bis(3-maleimidephenoxy)-biphenyl (10.0) | 2,2-bis(4-hydroxy-3-allyl-phenyl)propane (5.0) | 28 | 17.4 | 370 | 284 | 0.28 |
| Ex. 6 | 2,2-bis[4-(3-maleimide-phenoxy)phenyl]propane (10.0) | 4,4'-dihydroxy-3,3'-diallyl-biphenyl (5.0) | 29 | 17.9 | 365 | 284 | 0.27 |
| Ex. 7 | Bis[4-(3-maleimidephenoxy)-phenyl]sulfide (10.0) | Bis(4-hydroxy-3-allyl-phenyl)ether (5.0) | 28 | 18.0 | 367 | 285 | 0.28 |
| Comp. Ex. 1 | 4,4'-bis(3-maleimidephenoxy)-biphenyl (10.0) | 2,2-bis(4-hydroxy-3-allyl-phenyl)propane (20.0) | 27 | 12.5 | 335 | 196 | 0.46 |
| Comp. Ex. 2 | 4,4'-bis(3-maleimidephenoxy)-biphenyl (10.0) | 2,2-bis(4-hydroxy-3-allyl-phenyl)propane (13.0) | 29 | 13.0 | 349 | 252 | 0.32 |
| Comp. Ex. 3 | 4,4'-bis(3-maleimidephenoxy)-biphenyl (12.0) | 2,2-bis(4-hydroxy-3-allyl-phenyl)propane (1.0) | 5 | 8.6 | 510 | 300° C. or higher | 0.25 |
| Comp. Ex. 4 | N,N'-4,4'-diphenylmethane-bismaleimide (10.0) | (Diamine compound) 4,4'-diaminodiphenyl-methane (5.0) | 11 | 9.2 | 372 | 289 | 0.91 |

We claim:

1. A thermosetting-resin-forming composition comprising:

(a) a bismaleimide compound represented by the following formula (I):

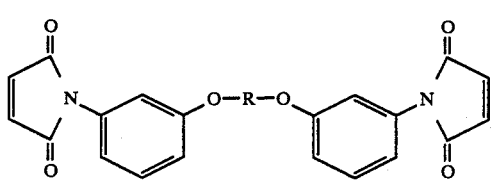

phenyl]sulfoxide, bis[4-(3-maleimidephenoxy)-phenyl]-sulfone and bis[4-(3-maleimidephenoxy)phenyl]ether.

3. The composition of claim 1, wherein the bismaleimide compound is selected from the group consisting of 4,4 -bis(3-maleimidephenoxy)biphenyl, 1,3-bis(3-maleimidephenoxy)benzene, 2,2-bis[4-(3-maleimidephenoxy)phenyl]propane and bis[4-(3-maleimidephenoxy)-phenyl]sulfide.

4. The composition of claim 1, wherein the diallylbisphenol is selected from the group consisting of 4,4'-dihydroxy-3,3'-diallylbiphenyl, bis(4-hydroxy-3-allylphenyl)methane, 2,2-bis(4-hydroxy-3-allylphenyl)-propane, 2,2-bis(4-hydroxy-3-allylphenyl)-1,1,1,3,3,3-hexafluoropropane, bis(4-hydroxy-3-allylphenyl) sulfide and bis(4-hydroxy-3-allylphenyl) ether.

5. The composition of claim 1, wherein the diallylbisphenol is selected from the group consisting of 2,2-bis(4-hydroxy-3-allylphenyl)propane, 4,4'-dihydroxy-3,3'-diallylbiphenyl and bis(4-hydroxy-3-allylphenyl) ether.

6. The composition of claim 1, which has been obtained by mixing the bismaleimide compound and the diallylbisphenol compound.

7. The composition of claim 1, which has been obtained by mixing the bismaleimide compound and the diallylbisphenol compound, subjecting the resultant mixture to heat treatment at about 70°-200° C. and then grinding the mixture thus heat-treated.

8. The composition of claim 1, which has been obtained by dissolving the bismaleimide compound and the diallylbisphenol compound in an organic solvent, subjecting the resultant solution to heat treatment to partially cure the bismaleimide compound and the diallylbisphenol compound to the stage of a prepolymer and then pouring the heat-treated solution into a poor solvent to have the prepolymer precipitated.

* * * * *

UNITED STATES PATENT AND TRADEMARK OFFICE
CERTIFICATE OF CORRECTION

PATENT NO. : 4,968,762

DATED : November 6, 1990

INVENTOR(S) : Norimasa Yamaya, et al

It is certified that error appears in the above-identified patent and that said Letters Patent is hereby corrected as shown below:

Col. 6, claim 1, line 11, between "carbonyl" and "thio" insert --,--.

Col. 7, claim 3, line 5, amend "4,4" to --4,4'--.

Signed and Sealed this

Seventh Day of July, 1992

Attest:

DOUGLAS B. COMER

Attesting Officer

Acting Commissioner of Patents and Trademarks